United States Patent
Kim et al.

(10) Patent No.: US 9,722,287 B2
(45) Date of Patent: Aug. 1, 2017

(54) FRAME FOR SECONDARY BATTERY INCLUDING COOLING PLATE AND MAIN FRAME HAVING UNIT FRAME HORIZONTALLY SPACED APART AND BATTERY MODULE INCLUDING THE SAME

(71) Applicant: LG CHEM, LTD., Seoul (KR)

(72) Inventors: Ki-Youn Kim, Daejeon (KR); Jun-Yeob Seong, Daejeon (KR); Young-Sop Eom, Daejeon (KR); Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/899,236

(22) PCT Filed: May 12, 2015

(86) PCT No.: PCT/KR2015/004760
§ 371 (c)(1),
(2) Date: Dec. 17, 2015

(87) PCT Pub. No.: WO2015/186912
PCT Pub. Date: Dec. 10, 2015

(65) Prior Publication Data
US 2016/0149277 A1    May 26, 2016

(30) Foreign Application Priority Data
Jun. 5, 2014 (KR) .................. 10-2014-0068471

(51) Int. Cl.
*H01M 2/10* (2006.01)
*H01M 10/65* (2014.01)
(Continued)

(52) U.S. Cl.
CPC ......... *H01M 10/6554* (2015.04); *H01M 2/10* (2013.01); *H01M 2/1077* (2013.01);
(Continued)

(58) Field of Classification Search
CPC .......... H01M 10/6554; H01M 10/655; H01M 10/65; H01M 2/10; H01M 2/1077
(Continued)

(56) References Cited

U.S. PATENT DOCUMENTS

2009/0253026 A1* 10/2009 Gaben .................... B60R 16/04
429/56
2010/0266883 A1    10/2010 Koetting et al.
(Continued)

FOREIGN PATENT DOCUMENTS

DE    10 2011 107 007 A1    1/2013
JP    2005-285456 A    10/2005
(Continued)

OTHER PUBLICATIONS

International Search Report, issued in PCT/KR2015/004760, mailed Jul. 24, 2015.
(Continued)

*Primary Examiner* — Sean P Cullen
(74) *Attorney, Agent, or Firm* — Birch, Stewart, Kolasch & Birch, LLP

(57) ABSTRACT

Disclosed is a frame for a secondary battery, which has an improved structure to prevent a cooling plate from being deformed or distorted due to shrinkage of a main frame. The frame for a secondary battery includes a cooling plate made of a thermally conductive material with a plate shape, and a main frame having a plurality of unit frames spaced apart from each other in a horizontal direction by a predetermined distance, the main frame being configured to surround a rim of the cooling plate and made of a material different from the cooling plate.

16 Claims, 5 Drawing Sheets

(51) Int. Cl.
  *H01M 10/6555* (2014.01)
  *H01M 10/6554* (2014.01)
  *H01M 10/655* (2014.01)

(52) U.S. Cl.
  CPC ......... *H01M 10/65* (2015.04); *H01M 10/655* (2015.04); *H01M 2220/20* (2013.01)

(58) Field of Classification Search
  USPC .................. 429/100, 120, 149, 156, 162
  See application file for complete search history.

(56) References Cited

U.S. PATENT DOCUMENTS

| 2010/0304203 | A1* | 12/2010 | Buck | ............... H01M 2/1072 429/120 |
|---|---|---|---|---|
| 2011/0059345 | A1 | 3/2011 | Kim et al. | |
| 2011/0206966 | A1 | 8/2011 | Schmid et al. | |
| 2011/0293982 | A1 | 12/2011 | Martz et al. | |
| 2012/0282496 | A1 | 11/2012 | Schaefer | |
| 2013/0040175 | A1 | 2/2013 | Yang et al. | |
| 2015/0093608 | A1 | 4/2015 | Seong et al. | |

FOREIGN PATENT DOCUMENTS

| JP | 2013-517591 A | 5/2013 |
|---|---|---|
| KR | 10-2010-0115709 A | 10/2010 |
| KR | 10-2011-0026048 A | 3/2011 |
| KR | 10-2012-0126208 A | 11/2012 |
| KR | 10-2014-0023756 A | 2/2014 |
| WO | WO 2012/140534 A1 | 10/2012 |

OTHER PUBLICATIONS

Written Opinion of the International Searching Authority, issued in PCT/KR2015/004760, mailed Jul. 24, 2015.

* cited by examiner

FRAME FOR SECONDARY BATTERY INCLUDING COOLING PLATE AND MAIN FRAME HAVING UNIT FRAME HORIZONTALLY SPACED APART AND BATTERY MODULE INCLUDING THE SAME

TECHNICAL FIELD

The present application claims priority to Korean Patent Application No. 10-2014-0068471 filed on Jun. 5, 2014 in the Republic of Korea, the disclosures of which are incorporated herein by reference.

The present disclosure relates to a battery, and more particularly, to a frame for a secondary battery, which is used for configuring a battery module with a plurality of secondary batteries, and a battery module including the same.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and an negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can type secondary battery where the electrode assembly is included in a metal can and a pouch type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, in middle-sized or large-sized devices, pouch-type secondary batteries are frequently used since they can be easily stacked.

However, a pouch-type secondary battery does not have great mechanical rigidity since it is generally packaged with a battery case made of a laminate sheet of aluminum and polymer. Therefore, when configuring a battery module including a plurality of pouch-type secondary batteries, a stacking frame is frequently used to protect the secondary batteries from external impacts or the like, prevent fluctuation of the secondary batteries and facilitate easier stacking of the secondary batteries. This stacking frame is also called a cartridge.

FIG. 1 is a top view schematically showing an existing frame for a secondary battery.

Referring to FIG. 1, the existing frame for a secondary battery may be configured to have a frame body 10 in a tetragonal plate shape with a hollow center, and a rim of a secondary battery may be placed on a part of the frame body 10. In addition, a plurality of frames may be stacked to configure a battery module, and a secondary battery may be located in a vacuum space formed among the stacked frames.

Meanwhile, when a plurality of secondary batteries are assembled using a plurality of frames as described above, a cooling plate 20 may be interposed between secondary batteries as shown in FIG. 1. The secondary battery may be used in a high-temperature environment, for example in summer, and the secondary battery may also generate heat in itself. At this time, if a plurality of secondary batteries are stacked, the temperature of the secondary batteries may rise higher. If the temperature rises higher than a suitable level, the secondary batteries may suffer from deteriorated performance or in severe cases may cause explosion or fire. Therefore, when configuring a battery module, the cooling plate 20, also called a cooling fin, is frequently interposed between secondary batteries in order to prevent a temperature rise of the secondary batteries by means of the cooling plate 20.

If the cooling plate 20 is interposed between secondary batteries of the battery module, the secondary batteries may be cooled in various forms and ways. Representatively, an external air may be allowed to flow around the cooling plate 20 to lower the temperature of secondary batteries by means of heat exchange between the cooling plate 20 and the air, which is called air-cooling, widely used in the art.

Generally, the cooling plate 20 is made of metallic material such as aluminum, and other portions except for the cooling fin, namely the frame body 10, may be made of plastic or the like. The frame for a secondary battery may be manufactured in various ways, representatively by means of insert injection. In the insert injection, the cooling plate 20 is prepared first, and then, in a state where the cooling plate 20 is put into an insert-injection molding machine, the frame body 10 is injection-molded to make the frame for a secondary battery.

However, in the above manufacturing method, the cooling plate 20 may be deformed due to the shrinkage of the frame body 10. In other words, during the insert-injection molding, a cooling process from high temperature to low temperature is performed, and at this time, the frame body 10 subject to injection molding may be relatively greatly shrunken in comparison to the cooling plate 20. For example, during the cooling process, the frame body 10 may be shrunken as indicated by arrows in FIG. 1.

The cooling plate 20 is commonly configured to have a thin plate shape. Therefore, if the frame body 10 is shrunken as described above, the cooling plate 20 may be deformed or distorted while being impatient to the shrinkage of the frame body 10. In addition, such deformation or distortion may result in the decrease of a contact surface between the secondary battery and the cooling plate 20 or an instable cooling channel, which may greatly deteriorate the cooling effects.

Moreover, if the cooling plate 20 is distorted or deformed due to expansion or shrinkage of the frame body 10, the shape or size of the frame for a secondary battery may vary as a whole. Therefore, when configuring a battery module by stacking such frames for a secondary battery, the frames may not be easily stacked, and also after they are completely stacked, the overall shape or dimension of the battery module may be changed or the frames may be stacked unstably.

DISCLOSURE

Technical Problem

The present disclosure is designed to solve the problems of the related art, and therefore the present disclosure is directed to providing a frame for a secondary battery, which has an improved structure to prevent a cooling plate from being deformed or distorted due to shrinkage of a main frame during a manufacturing procedure, and also providing a battery module, a battery pack and a vehicle having the above frame.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a frame for a secondary battery, which includes a cooling plate made of a thermally conductive material with a plate shape; and a main frame having a plurality of unit frames spaced apart from each other in a horizontal direction by a predetermined distance, the main frame being configured to surround a rim of the cooling plate and made of a material different from the cooling plate.

Preferably, the cooling plate may have a tetragonal shape, when being observed from the above.

Also preferably, the main frame may be configured to have two or more unit frames at each side of the cooling plate.

Also preferably, the cooling plate may have a rectangular shape, when being observed from the above, and the main frame may be configured so that the number of unit frames disposed at a long side of the cooling plate is greater than the number of unit frames disposed at a short side of the cooling plate.

Also preferably, the main frame may be configured so that a unit frame located at one side of the cooling plate extends via an edge of the cooling plate to another side of the cooling plate.

Also preferably, the main frame may have openings at opposite sides of the cooling plate, respectively.

Also preferably, the cooling plate may include an upper plate and a lower plate, which respectively have a plate shape and are spaced apart from each other in a vertical direction by a predetermined distance to face each other.

Also preferably, the main frame may have an opening formed at a side thereof so that at least a part of an empty space between the upper plate and the lower plate is opened.

Also preferably, the upper plate and the lower plate may be configured so that one ends thereof protrude out of the main frame through the opening and the protruded portions are respectively bent upwards and downwards.

Also preferably, at least one of the upper plate and the lower plate may have a bead protruding toward the other plate.

Also preferably, at least one of the plurality of unit frames may at least partially include an upper frame located above the cooling plate and a lower frame located below the cooling plate, and the upper frame and the lower frame are connected to each other by a connection provided through the cooling plate.

Also preferably, the cooling plate may be made of aluminum, and the main frame may be made of a polymer resin material.

Also preferably, the main frame may be formed by means of insert injection in a state where the cooling plate is being inserted therein.

In another aspect of the present disclosure, there is also provided a battery module, which includes the frame for a secondary battery according to the present disclosure.

In another aspect of the present disclosure, there is also provided a battery pack, which includes the frame for a secondary battery according to the present disclosure.

In another aspect of the present disclosure, there is also provided a vehicle, which includes the frame for a secondary battery according to the present disclosure.

Advantageous Effects

According to an aspect of the present disclosure, since a frame body, namely a main frame, made of different material from the cooling plate is not composed of a single unit element but composed of a plurality of physically divided unit elements, it is possible to prevent the cooling plate from being distorted or deformed due to shrinkage or expansion of the main frame.

Therefore, in this aspect of the present disclosure, a cooling channel may be stably ensured around the cooling plate, and a facing surface area between the secondary battery and the cooling plate is maintained broadly and a distance between them is maintained constantly, thereby stably ensuring the cooling performance of the secondary battery through the cooling plate.

In particular, according to an embodiment of the present disclosure, since two cooling plates are provided at a single frame for a secondary battery and a cooling channel is formed between two cooling plates, a cooling channel is stably ensured adjacent to the cooling plate, and a fluid may smoothly flow through the cooling channel.

In addition, in an aspect of the present disclosure, even though the main frame is shrunken or expanded to some extent, the overall shape of the frame for a secondary battery may be maintained as it originally is. Therefore, when frames are stacked to configure a battery module, the frames may be easily stacked, and it is possible to stably maintain an overall shape and size of the battery module and its assembled state.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

A frame for a secondary battery according to the present disclosure is used for configuring a battery module by stacking and packaging a plurality of secondary batteries, and the frame for a secondary battery may hold secondary batteries to prevent movement thereof and guide assembly of the secondary batteries.

Figure 2:
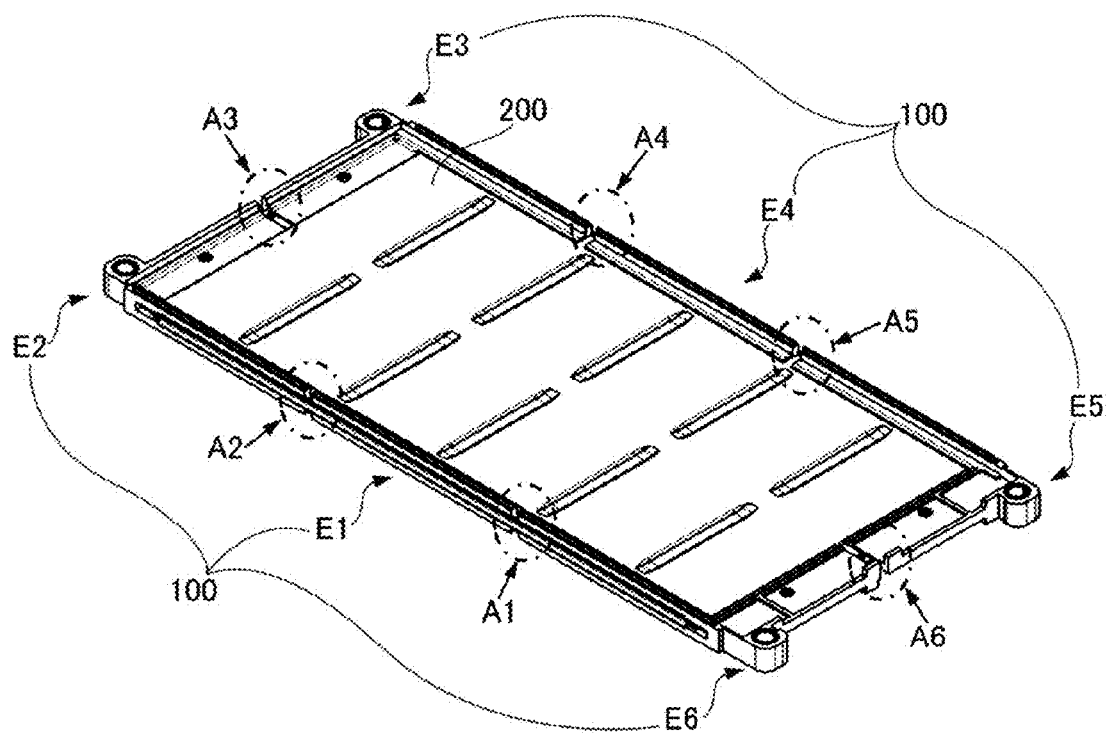
FIG. 2 is a perspective view schematically showing a frame for a secondary battery according to an embodiment of the present disclosure.

FIG. 2 is a perspective view schematically showing a frame for a secondary battery according to an embodiment of the present disclosure.

Referring to FIG. 2, the frame for a secondary battery according to the present disclosure includes a cooling plate 200 and a main frame 100.

The cooling plate 200 has a broad plate shape and is disposed in a laid state so that broad surfaces are oriented upwards and downwards. In particular, the cooling plate 200 may have a tetragonal shape, when being observed from the above, as shown in FIG. 2.

The cooling plate 200 transfers a heat emitted from the secondary battery to the outside and may be made of a thermally conductive material. In particular, the cooling plate 200 may be made of a metallic material with high thermal conductivity, and in this case, the cooling plate 200 may have a thin metal plate shape.

Preferably, the cooling plate 200 may be made of aluminum. Aluminum has excellent thermal conductivity, allows easy molding and has a light weight. Therefore, in this embodiment, the cooling plate 200 may ensure good heat transfer, and thus it is possible to ensure stable cooling performance of the battery module. In addition, by reducing the increase of weight by the cooling plate 200, it is possible to design a battery module or a battery pack with a light weight. However, the present disclosure is not limited to the above material of the cooling plate 200, and the cooling plate 200 may be made of various materials, for example metals other than aluminum.

The main frame 100 is a frame body and may be made of a material different the cooling plate 200. Preferably, the main frame 100 may be made of a polymer resin material. For example, the main frame 100 may be made of a thermoplastic resin. If the main frame 100 is made of a polymer resin, namely a plastic material, as described above, the main frame 100 may ensure easy molding, light weight and stable mechanical strength, and thus it is possible to stably protect components such as secondary batteries therein against external impacts.

The main frame 100 may be configured to surround a perimeter of the cooling plate 200. The main frame has a top surface, a bottom surface, an inner surface and an outer surface. In particular, the cooling plate 200 may have a polygonal shape with several sides, and in this case, the main frame 100 may be configured to surround a rim of the cooling plate 200 at each edge thereof. For example, as shown in FIG. 2, the cooling plate 200 may have a tetragonal shape with four sides. In this case, the main frame 100 may be configured to surround four sides, namely outer circumferences, of the cooling plate 200. In addition, central portions of the cooling plate 200 other than rims are not surrounded by the main frame 100 and thus may be exposed upwards or downwards.

The main frame 100 may be configured so that a secondary battery, particularly a pouch-type secondary battery, is mounted thereto. Further, the main frame 100 may be configured so that an outer circumference of the pouch-type secondary battery is placed thereon. For example, the main frame 100 may have a square-ring shape as a whole according to the shape of the cooling plate 200, and in this case, an outer circumference of the pouch-type secondary battery having a square shape may be placed on the main frame 100.

Preferably, two pouch-type secondary batteries may be mounted to the main frame 100. In other words, the cooling plate 200 may be located at a central portion of the main frame 100 in a vertical direction, and two pouch-type secondary batteries may be located above and below the cooling plate 200. Therefore, in this case, a plurality of frames are stacked in a vertical direction, two secondary batteries may be received in each frame.

In particular, in the frame for a secondary battery according to the present disclosure, the main frame 100 may have a plurality of unit frames.

The unit frames are physically separated from each other and may be arranged to be spaced apart from each other by a predetermined distance in a horizontal direction. For example, as indicated by A1 to A6 in FIG. 2, the main frames 100 may be provided at six locations to be spaced apart from each other. In this case, unit frames E1, E2, E3, E4, E5 and E6 may be located between A1 and A2, between A2 and A3, between A3 and A4, between A4 and A5, between A5 and A6 and between A6 and A1, respectively. In addition, these unit frames may be provided to be spaced apart from each other, without coming into contact with each other.

In the above configuration of the present disclosure, even though the main frame 100 is expanded or shrunken due to a temperature change, it is possible to prevent the cooling plate 200 from being distorted or deformed. In particular, a molding method such as insert-injection molding may be used for manufacturing the frame for a secondary battery according to the present disclosure, and even though a cooling process is performed in the above method, it is possible to greatly reduce deformation of the cooling plate 200. This will be described in more detail with reference to FIG. 3.

Figure 3:
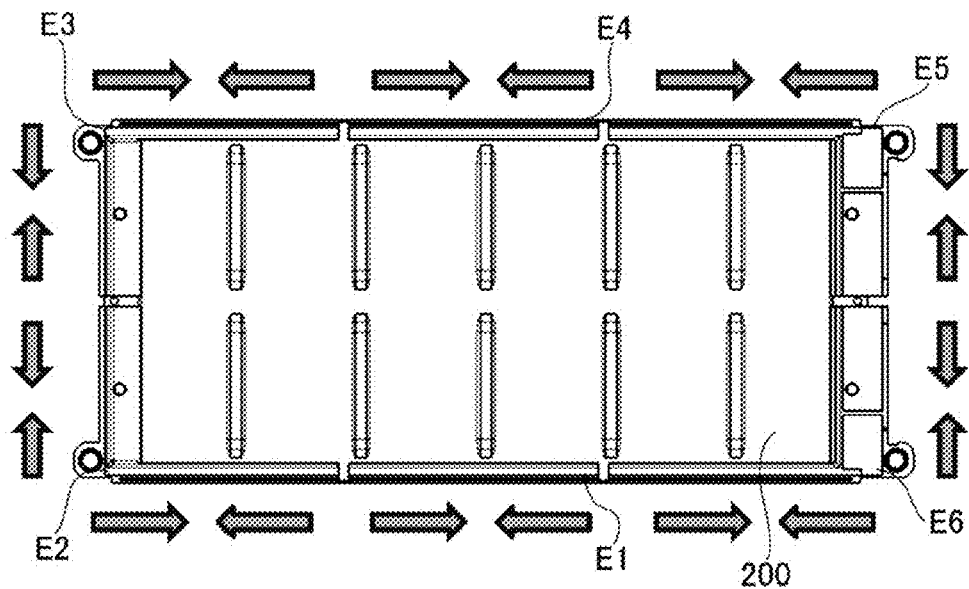
FIG. 3 is a top view for illustrating shrinkage of a main frame when the frame for a secondary battery as depicted in FIG. 2 is cooled.

FIG. 3 is a top view for illustrating shrinkage of the main frame 100 when the frame for a secondary battery as depicted in FIG. 2 is cooled.

Referring to FIG. 3, in the frame for a secondary battery according to the present disclosure, unit frames of the main frame 100 are spaced apart from each other in a horizontal direction. In this case, if the frame for a secondary battery is cooled, the main frame 100 is shrunken so that each unit frame is shrunken as indicated by arrows. Therefore, during the cooling process, the shrinkage of the main frame 100 is not focused to any local point but distributed to every unit frame, and the overall shrinkage of the main frame 100 is reduced. Therefore, in this aspect of the present disclosure, it is possible to prevent the cooling plate 200 from being distorted or deformed due to shrinkage of the main frame 100.

Meanwhile, the cooling plate 200 may be configured with a polygonal shape. In this case, the main frame 100 may be configured to have two or more unit frames at one or more side of the cooling plate 200. For example, if the cooling plate 200 has a rectangular shape, the main frame 100 may have one unit frame at each of two short sides of the cooling plate 200 of a rectangular shape and two unit frames at each of two long sides thereof.

Preferably, the main frame 100 may be configured so that two or more unit frames at each side of the cooling plate 200.

For example, as shown in FIG. 2, the cooling plate 200 may be configured with a tetragonal shape. In this case, the main frame 100 may be configured so that two or more unit frames are disposed at each of four sides of the cooling plate 200.

In particular, the cooling plate 200 may have a rectangular shape, when being observed from the above. In this case, the main frame 100 may be configured so that the number of unit frames disposed at a long side of the cooling plate 200 is greater than the number of unit frames disposed at a short side thereof.

For example, as shown in FIG. 2, when the cooling plate 200 has a rectangular shape, the main frame 100 may include three unit frames disposed at a long side of the cooling plate 200 and two unit frames disposed at a short side of the cooling plate 200. In other words, in the configuration depicted in FIG. 2, three unit frames E6, E1 and E2 are located at a front long side of the cooling plate 200, and three unit frames E3, E4 and E5 are located at a rear long side of the cooling plate 200. Meanwhile, two unit frames E2 and E3 are located at a left short side of the cooling plate 200, and two unit frames E5 and E6 are located at a right short side of the cooling plate 200.

Figure 1:
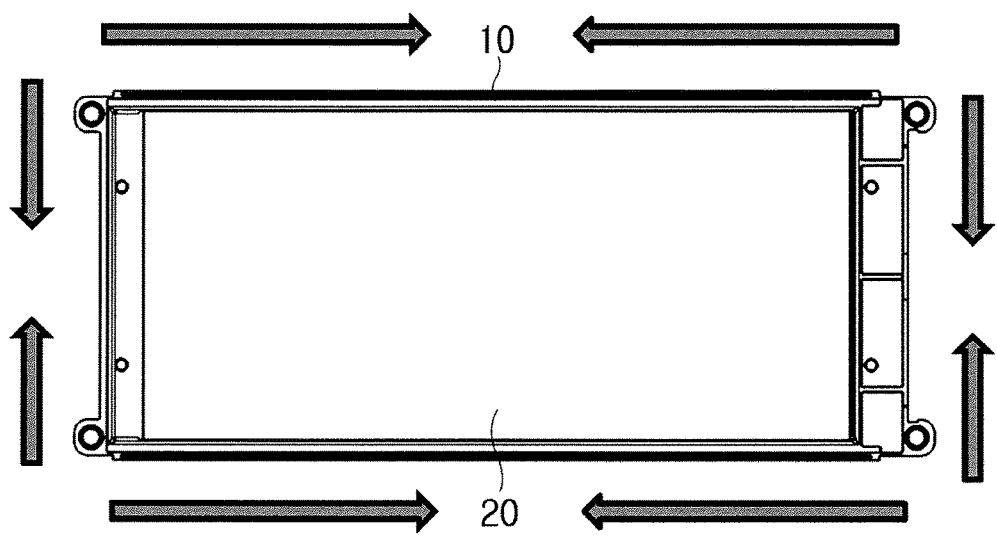
FIG. 1 is a top view schematically showing an existing frame for a secondary battery.

In this embodiment of the present disclosure, the main frame 100 may be divided more at a portion which may be shrunken more seriously, thereby more efficiently distributing and reducing shrinkage of the main frame 100. For example, in the configuration of FIG. 1, the main frame 100 located at the long side of the cooling plate 200 may be shrunken or deformed more serious in comparison to the main frame 100 located at the short side thereof. However, if the long side is divided more as in the embodiments depicted in FIGS. 2 and 3, it is possible to effectively prevent the main frame 100 from being deformed.

Also preferably, the main frame 100 may be configured so that a unit frame located at one side of the cooling plate 200 extends via an edge of the cooling plate 200 to another side of the cooling plate 200.

For example, in the configuration of FIG. 2, the unit frames E2, E3, E5 and E6 are disposed at both the long side and the short side of the cooling plate 200 having a tetragonal shape, and the portions of each unit frame located at a long side and a short side are connected to each other at each edge of the cooling plate 200.

In this configuration of the present disclosure, a single unit frame is located at both the long side and the short side of the cooling plate 200, which allows each side of the cooling plate 200 to have a divided area and also prevent the number of unit frames from increasing unnecessarily. Therefore, it is possible to distribute or reduce shrinkage of the main frame 100 and improve mechanical strength of the main frame 100.

Preferably, the cooling plate 200 may have two plates arranged in a vertical direction. This will be described in more detail with reference to FIGS. 4 and 5.

Figure 4:
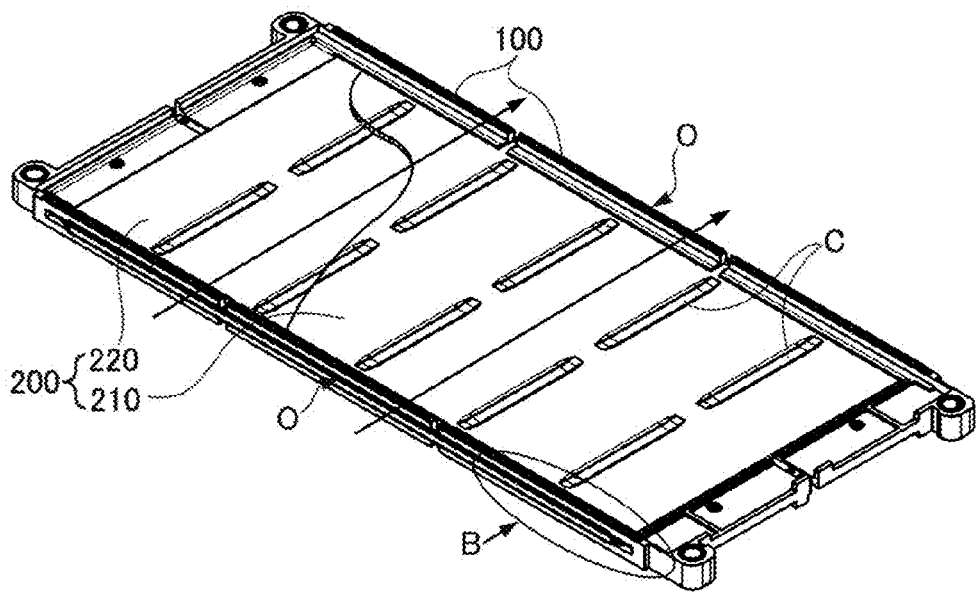
FIG. 4 is a partially-sectioned schematic view of FIG. 2.
Figure 5:
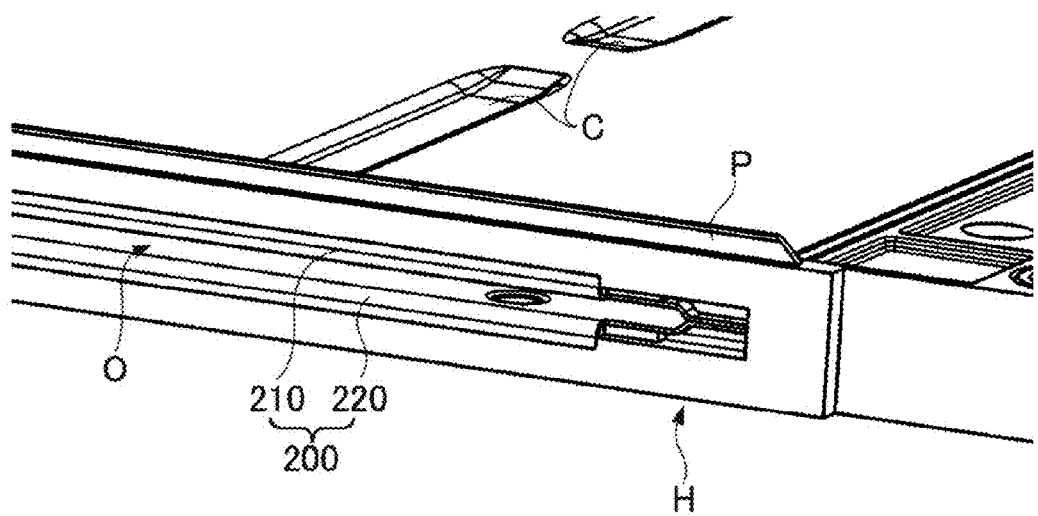
FIG. 5 is an enlarged view showing a portion B of FIG. 4.

FIG. 4 is a partially-sectioned schematic view of FIG. 2, and FIG. 5 is an enlarged view showing a portion B of FIG. 4.

Referring to FIGS. 4 and 5, the cooling plate 200 may include an upper plate 210 and a lower plate 220. Here, the upper plate 210 and the lower plate 220 respectively have a broad plate shape and are disposed to be laid so that their broad surfaces are oriented upwards and downwards. In addition, the upper plate 210 and the lower plate 220 may be configured to have the same shape, for example a tetragonal plate shape.

In the frame for a secondary battery as described above, a central portion of the upper plate 210 may be exposed upwards, and a central portion of the lower plate 220 may be exposed downwards. In addition, one pouch-type secondary battery may be located above the upper plate 210, and one pouch-type secondary battery may be located below the lower plate 220.

In particular, the upper plate 210 and the lower plate 220 may be arranged so that their broad surfaces are spaced apart from each other by a predetermined distance in a vertical direction to face each other. In other words, the lower plate 220 may be spaced apart from the lower portion of the upper plate 210 so that a broad surface of the lower plate 220 faces a broad surface of the upper plate 210. Further, the lower plate 220 may be configured to be in parallel to the upper plate 210 in a horizontal direction.

As described above, the upper plate 210 and the lower plate 220 are configured to be spaced apart from each other in a vertical direction by a predetermined distance, and an empty space is formed between the upper plate 210 and the lower plate 220. This empty space may serve as a channel through which a fluid such as air may pass. In particular, a cooling fluid may flow through the empty space between the upper plate 210 and the lower plate 220, so as to perform heat exchange with a secondary battery through the upper plate 210 and the lower plate 220. Therefore, the empty space between the upper plate 210 and the lower plate 220 may become a cooling channel.

Preferably, the main frame 100 may have an opening at a side thereof, as indicated by O in FIG. 5. In particular, if the cooling plate 200 includes the upper plate 210 and the lower plate 220 as in this embodiment, the opening may be formed to open at least a part of the empty space between the upper plate 210 and the lower plate 220, namely the cooling channel.

The opening O may be formed through the main frame 100 in a horizontal direction and may also expose the channel formed between two cooling plates 200 to the outside. Therefore, in this embodiment of the present disclosure, an external air of the main frame 100 may flow into or out of the cooling channel through the opening.

At this time, at least two openings O may be formed in the main frame 100. In this case, at least one opening may serve as an inlet, and the other opening may serve as an outlet.

In particular, if two or more openings are formed, one opening may be formed at a side opposite to another opening. For example, as shown in FIG. 4, if one opening is formed at a front side of the main frame 100, another one opening may be formed at a rear side of the main frame 100, which is opposite to the front side.

In this configuration of the present disclosure, as indicated by arrows, a flow direction of a fluid flowing into the cooling channel through the opening, a flow direction of a fluid flowing in the cooling channel and a flow direction of a fluid flowing out of the cooling channel through the opening are identical to each other and thus form a single line, which ensures better flow of the cooling fluid. Therefore, the secondary battery cooling efficiency using the cooling fluid may be further improved.

Also preferably, the upper plate 210 and the lower plate 220 may be configured so that one ends thereof protrude out of the main frame 100 through the opening, and the protruded portions may be bent upwards and downwards, respectively.

For example, referring to FIG. 5, one end of the upper plate 210 may protrude out of the main frame 100 through the opening formed in the main frame 100, and the protruded portion may be bent upwards. In addition, the bent portion of the upper plate 210 may come into contact with an upper portion of outer sides of the main frame 100.

In addition, in the configuration of FIG. 5, one end of the lower plate 220 may protrude out of the main frame 100 through the opening formed in the main frame 100, and the protruded portion may be bent downwards. In addition, the bent portion of the lower plate 220 may come into contact with a lower portion of outer sides of the main frame 100.

In this embodiment of the present disclosure, the upper plate 210 and the lower plate 220 may be stably coupled to the main frame 100, and it is possible to prevent the opening of the main frame 100 from being blocked due to the upper plate 210 and the lower plate 220, thereby stably ensuring the cooling channel.

Also preferably, a bead may be formed on at least one of the upper plate 210 and the lower plate 220. For example, as indicated by a reference symbol C in FIGS. 4 and 5, a bead may be formed on the upper plate 210. In addition, though not clearly shown in FIGS. 4 and 5, a bead may also be formed on the lower plate 220 to have a shape and location corresponding to the bead of the upper plate 210.

Here, the bead C may be formed to protrude toward another cooling plate 200. In other words, the bead of the upper plate 210 may be formed to protrude downwards, and the bead of the lower plate 220 may be formed to protrude upwards. At this time, the bead of the upper plate 210 and the bead of the lower plate 220 may come into contact with each other.

In this embodiment of the present disclosure, since the beads C improve mechanical rigidity of the upper plate 210 and the lower plate 220 and also keep a vertical distance between them constantly, it is possible to prevent the upper plate 210 and the lower plate 220 from being deformed and also stably ensure the cooling channel formed between them.

The bead C may be formed to elongate in one direction as shown in FIG. 4. At this time, its longitudinal direction may be parallel to the direction of the channel.

In addition, a plurality of beads C may be formed on the upper plate 210 and/or the lower plate 220. In this case, the beads may be arranged to be spaced apart from each other in a horizontal direction, particularly in a direction perpendicular to the channel direction by a predetermined distance.

Meanwhile, two or more main frames 100 may be configured to be stackable, and by doing so, two or more frames for a secondary battery may be stacked. In other words, other main frames 100 may be stacked above and below the main frame 100 depicted in FIG. 2. If two or more frames for a secondary battery are stacked as above, the main frames 100 are disposed at an outer circumference on the basis of the secondary battery, and the cooling plate 200 is disposed at an upper or lower portion.

In particular, in order to facilitate easier stacking of two or more main frames 100, the main frames 100 may have protrusions protruding in a vertical direction and insert grooves shaped corresponding to the protrusions. For example, the main frame 100 may have a protrusion protruding upwards thereon, as indicated by a reference symbol P in FIG. 5. In addition, the main frame 100 may have an insert groove concavely formed in its lower portion to have a shape and location corresponding to the protrusion, as indicated by a reference symbol H in FIG. 5. In this case, when frames for a secondary battery are stacked in a vertical direction, the protrusion P of a main frame 100 located below may be inserted into the insert groove H of a main frame 100 located above.

In this embodiment, since the protrusion P and the insert groove H guide stacking of the main frames 100, namely the frames for a secondary battery, it is possible to facilitate easier stacking and also stably maintain a stacked state of the main frames 100 due to the coupling between the protrusion P and the insert groove H.

Preferably, at least one of the plurality of unit frames of the main frame 100 may include an upper frame and a lower frame partially or wholly. This configuration will be described in detail with reference to FIG. 6.

Figure 6:
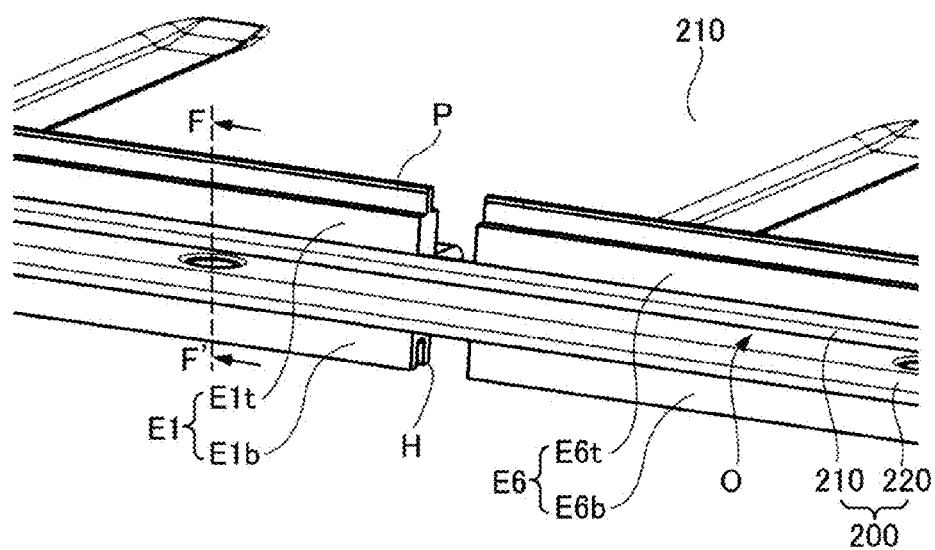
FIG. 6 is an enlarged view showing a portion A1 of FIG. 2.
Figure 7:
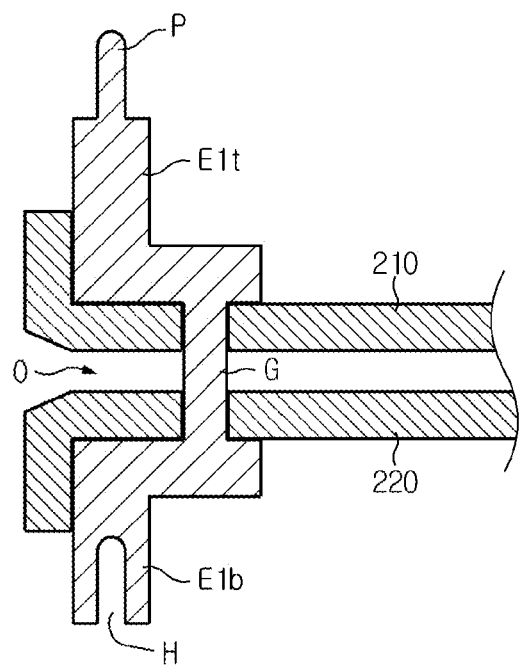
FIG. 7 is a cross-sectional view, taken along the line F-F' of FIG. 6.

FIG. 6 is an enlarged view showing a portion A1 of FIG. 2, and FIG. 7 is a cross-sectional view, taken along the line F-F' of FIG. 6.

Referring to FIGS. 6 and 7, a unit frame E1 includes an upper frame E1t and a lower frame E1b, and a unit frame E6 includes an upper frame E6t and a lower frame E6b. At this time, the upper frame E1t and the lower frame E1b of the unit frame E1 are spaced apart from each other by a predetermined distance in a vertical direction, and the spaced portion forms an opening of the unit frame E1, so that a channel may be exposed between the upper plate 210 and the lower plate 220. In addition, the upper frame E6t and the lower frame E6b of the unit frame E6 are spaced apart from each other by a predetermined distance in a vertical direction, and the spaced portion may form an opening of the unit frame E6.

Here, the upper frame and the lower frame provided at each unit frame may be connected to each other through another portion of the corresponding unit frame. In other words, the unit frame may diverge upwards and downwards at a partial portion, so that the upwardly extended portion is located above the cooling plate 200 to form an upper frame, and the downwardly extended portion is located below the cooling plate 200 to form a lower frame. In other case, the unit frame may not diverge at its partial portion but be configured to have only the upper frame and the lower frame as a whole.

For example, in the configuration of FIGS. 2 and 6, the unit frame E1 may include an upper frame and a lower frame as a whole, and the upper frame and the lower frame may be not connected to each other out of the cooling plate 200. Meanwhile, in the configuration of FIGS. 2 and 6, the unit frame E6 may include an upper frame and a lower frame, and the unit frame E6 may further include a portion where the upper frame and the lower frame are not provided, so that the upper frame and the lower frame are connected to each other through the portion.

As described above, when the unit frame includes an upper frame and a lower frame, the upper frame and the lower frame may be connected to each other by means of a connection provided through the cooling plate 200.

For example, referring to FIG. 7, the upper frame E1t and the lower frame E1b provided at a single unit frame E1 are spaced apart from each other in a vertical direction, and a connection G extending in a vertical direction to have a top end connected to the upper frame E1t and a bottom end connected to the lower frame E1b may be provided at the unit frame. At this time, the connection G may be provided through the cooling plate 200, and for this, a hole may be formed in the cooling plate 200 for the connection G.

In particular, if the cooling plate 200 is composed of the upper plate 210 and the lower plate 220, the upper frame may be located above the upper plate 210, the lower frame may be located below the lower plate 220, and the connection G for connecting the upper frame and the lower frame may be provided through the upper plate 210 and the lower plate 220.

In this embodiment of the present disclosure, in a portion where the unit frame is divided into the upper frame and the lower frame to form the opening, the distance between the upper frame and the lower frame may be constantly maintained, and the mechanical strength thereof may be stably ensured.

Preferably, the frame for a secondary battery according to the present disclosure may be manufactured by means of insert-injection molding. In other words, in a state where the cooling plate 200 is inserted into an insert-injection machine, the main frame 100 may be injection-molded by means of the insert-injection machine, thereby manufacturing the frame for a secondary battery according to the present disclosure. In the present disclosure, since the main frame 100 is composed of a plurality of unit frames, while the main frame 100 is being cooled during the insert-injection molding procedure, it is possible to distribute and reduce shrinkage of the main frame 100 and also to prevent the cooling plate 200 from being distorted or deformed.

The battery module according to the present disclosure includes the frame for a secondary battery, described above. In particular, the battery module according to the present disclosure may include a plurality of pouch-type secondary batteries, and may also include a plurality of frames, described above, in order to stack and receive the plurality of pouch-type secondary batteries. At this time, the frames for a secondary battery may be stacked in a vertical direction, namely in an upper and lower direction, and the pouch-type secondary battery may be received in an inner space formed by the stacked frames. In particular, the battery module according to an embodiment of the present disclosure may be configured so that two pouch-type secondary batteries are received per a single frame.

A battery pack according to the present disclosure may include at least one battery module as described above. In addition, the battery module may include a plurality of frames according to the present disclosure. Moreover, the battery pack according to the present disclosure may further include a case for receiving the battery module, various devices for controlling charging/discharging of the battery module, for example a battery management system (BMS), a current sensor, a fuse or the like, in addition to the battery module.

The frame for a secondary battery according to the present disclosure may be applied to a vehicle such as an electric vehicle or a hybrid electric vehicle. In other words, the vehicle according to the present disclosure may include the battery pack as described above, and the battery pack may include the frame for a secondary battery according to the present disclosure.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, the terms indicating up, down, left and right directions are used in the specification, but it is obvious to those skilled in the art that these merely represent a relative location and may vary based on a location of an observer or a shape in which an object is placed.

REFERENCE SYMBOLS

100: main frame
E1, E2, E3, E4, E5, E6: unit frame
200: cooling plate
210: upper plate
220: lower plate

What is claimed is:

1. A frame for a secondary battery, comprising:
   a cooling plate made of a thermally conductive material with a plate shape; and
   a main frame having a plurality of unit frames spaced apart from each other in a horizontal direction, the main frame being configured to surround a perimeter of the cooling plate and made of a material different from the cooling plate,
   wherein at least one edge of the cooling plate is configured to have three or more unit frames.

2. The frame for a secondary battery according to claim 1, wherein the perimeter has a rectangular shape, and
   wherein the frame has a first edge and a second edge, the first edge being longer than the second edge, and
   wherein a number of unit frames disposed at the first edge of the cooling plate is greater than a number of unit frames disposed at the second edge of the cooling plate.

3. The frame for a secondary battery according to claim 1, wherein the main frame is configured so that at least one unit frame of the plurality of unit frames extends from the at least one edge of the cooling plate to another edge of the cooling plate.

4. The frame for a secondary battery according to claim 1, wherein at least one of the plurality of unit frames at least partially includes an upper frame located above the cooling plate and a lower frame located below the cooling plate, and the upper frame and the lower frame are connected to each other by a connection provided through the cooling plate.

5. The frame for a secondary battery according to claim 1, wherein the cooling plate is made of aluminum, and
   wherein the main frame is made of a polymer resin material.

6. The frame for a secondary battery according to claim 1, wherein the main frame is formed by means of insert injection in a state where the cooling plate is being inserted therein.

7. The frame for a secondary battery according to claim 1, wherein the perimeter has a tetragonal shape.

8. The frame for a secondary battery according to claim 7, wherein the cooling plate has two pair of opposite edges, and
   wherein at least one pair of the two pair of opposite edges has openings.

9. The frame for a secondary battery according to claim 1, wherein the cooling plate includes an upper plate and a lower plate, which respectively have a plate shape and are spaced apart from each other in a vertical direction to face each other.

10. The frame for a secondary battery according to claim 9, wherein at least one of the upper plate and the lower plate has a bead protruding toward the other plate.

11. The frame for a secondary battery according to claim 9, wherein the main frame has a top surface, a bottom surface, an inner surface and an outer surface, and wherein an opening extending between the inner surface and outer surface is formed so that at least a part of an empty space between the upper plate and the lower plate is opened.

12. The frame for a secondary battery according to claim 11, wherein one end of the upper plate and one end of the lower plate protrude through the opening and past the outer surface of the main frame to form a protruded end of the upper plate and a protruded end of the lower plate, respectively, and wherein the protruded end of the upper plate and the protruded end of the lower plate are respectively bent upwards and downwards.

13. A battery module, which comprises the frame for a secondary battery as defined in claim 1.

14. A battery pack, which comprises the frame for a secondary battery as defined in claim 1.

15. A vehicle, which comprises the frame for a secondary battery as defined in claim 1.

16. A frame for a secondary battery, comprising:

a cooling plate made of a thermally conductive material, the cooling plate having an upper plate and a lower plate;

a main frame having a plurality of unit frames spaced apart from each other in a horizontal direction, the main frame being configured to surround a perimeter of the cooling plate and made of a material different from the cooling plate, wherein the main frame has a top surface, a bottom surface, an inner surface and an outer surface;

an opening formed in the main frame; and an edge of the cooling plate extending through the opening, wherein a portion of the upper plate extending through the opening in the main frame is bent upwardly and a portion of the lower plate extending through the opening is bent downwardly.

* * * * *